April 24, 1951

JEAN ESTOUP
GENERALLY KNOWN AS
HENRI ESTOUP 2,550,541

TELEGRAPH SYSTEM WITH AN ANSWER BACK SIGNAL TRANSMITTER

Filed Oct. 1, 1949

2 Sheets-Sheet 1

Inventor
Jean Estoup
generally known as Henri Estoup
[signature]
Attorneys

April 24, 1951 | JEAN ESTOUP GENERALLY KNOWN AS HENRI ESTOUP | 2,550,541

TELEGRAPH SYSTEM WITH AN ANSWER BACK SIGNAL TRANSMITTER

Filed Oct. 1, 1949 | 2 Sheets-Sheet 2

Inventor
Jean Estoup
generally known as Henri Estoup
Bolein & Bastien
Attorneys

Patented Apr. 24, 1951

2,550,541

UNITED STATES PATENT OFFICE 2,550,541

TELEGRAPH SYSTEM WITH AN ANSWER-BACK SIGNAL TRANSMITTER

Jean Estoup, generally known as Henri Estoup, Sceaux, France, assignor to Mecanique et Transmission Metran, Paris, France Application October 1, 1949, Serial No. 119,191
In France October 5, 1948

9 Claims. (Cl. 178—4)

My invention relates to telegraph systems adapted to transmit any character, digit, sign or elementary movement through a train of equal impulses the number of which is predetermined and is always the same for a given signal that is to be transmitted. The stopping of the transmission of the impulses releases the translation of the corresponding letter.

My invention has for its object to provide such systems with means for transmitting the answer-back signal operating automatically when released through the reception of a predetermined combination of impulses transmitted by a calling apparatus so as to produce a number of impulse trains corresponding to the characters or digits forming together the desired answer-back signal, corresponding to the transmitter considered. It is a known fact that means for the transmission of an answer-back signal are considered as the essential complement of rapidly operating telegraphic systems of the so-called start-stop type, since it allows the called apparatus to continue operating without any supervision, the release by the calling station of the answer-back signal at the called station providing the dual certitude that the caller is actually in communication with the desired receiving station on one hand and that the called station is ready to receive on the other hand. Such an answer-back signal transmitter is still more necessary with slow working systems, the slowness of which restricts their use to telegraphing on a small scale, in which case the whole interest of the arrangement disappears if it is necessary to provide at the receiving station that is being called, an operator entrusted with the care of giving the caller the certitude that his message has been actually received by the desired called station.

However the mere incorporation of an independent transmitter for the answer-back signal to a translating receiver of an impulse-metering telegraphic system, may lose its interest if the total cost price of the devices comes too near that of a quickly operating system of the start-stop type.

It is of interest to design the mechanism translating and transmitting answer-back signals as a whole wherein the energy from a single source feeds both mechanisms so as to reduce as much as possible the number and the intricacy of the parts.

The invention has brought a solution to this problem and associates it in the transmitting receiving and translating devices with a printing in two colors of the messages, the transmitted messages being recorded for instance in red, and the received messages in black.

The invention consists in associating the winding up spindle for the translation mechanisms of impulse telegraph systems which spindle is adapted to execute one revolution after translation of each combination of signals during which revolution said translating mechanisms are returned into their inoperative position, with a spindle carrying a cam transmitting the answer-back signal impulses through actuation of a group of transmitting contact blades that is rigid with a position-controlling shoe and a further cam transmitting the answer-back signal that urges forwardly and rearwardly in alternation through cooperation with said shoe, said group of transmitting contact blades in order to transmit trains of impulses separated by inoperative periods in accordance with any predetermined combination; said spindle transmitting the answer-back signal is arrested when inoperative by a stop that may be moved away through a lever controlled by said translating mechanism when a predetermined combination of signals is being received and its movement is adjusted by a regulator when released through the release of said stop, the system of the spindle serving for winding up the translating mechanism and for transmitting answer-back signal being submitted simultaneously to the permanent action of a single driving spring through the agency of a differential gearing.

The invention has for its further object the association with said receiving, translating and answer-back-signal transmitting mechanism and with a sender mechanism of a transversal spindle carrying two spool carrying levers, of a two-color printing ribbon passing over said spools and of a releasing mechanism including a lever adapted to bear on a projection carried by said transversal spindle and to release said answer-back signal transmitting spindle, when a predetermined combination is translated. Said two color inking ribbon presents one color to the character wheel and said projecting assumes its operative lever-engaging position when said predetermined combination of impulses is being received without the sending mechanism being actuated while a pusher member controlled by said sending mechanism is adapted to shift said transversal spindle so that said two-color inking ribbon has its other color now registering with the character wheel and the projection faces a recess provided in the lever of the releasing mechanism in order to release the answer-back signal transmitter, when said sending mechanism is actuated.

The invention has lastly for its object, an improved structure of said cam transmitting the answer-back signal, which cam is made of a plate of thin sheet metal provided with radial slots arranged at the periphery thereof and the number of which is equal to the total number of impulses that may be transmitted during one revolution of the spindle transmitting the answer-back signal, the teeth thus defined being broken off at their root according to the impulse combination of the answer-back signal to be transmitted while the shoe controlling the position of the transmitting contact blades bears against said cam transmitting an answer-back signal along a bearing surface matching the outer circumference of the cam and assuming a length that is greater than the breadth of said slots.

I will now describe with full detail an embodiment of my invention, reference being made to the accompanying diagrammatic drawings, wherein.

Figure 1:
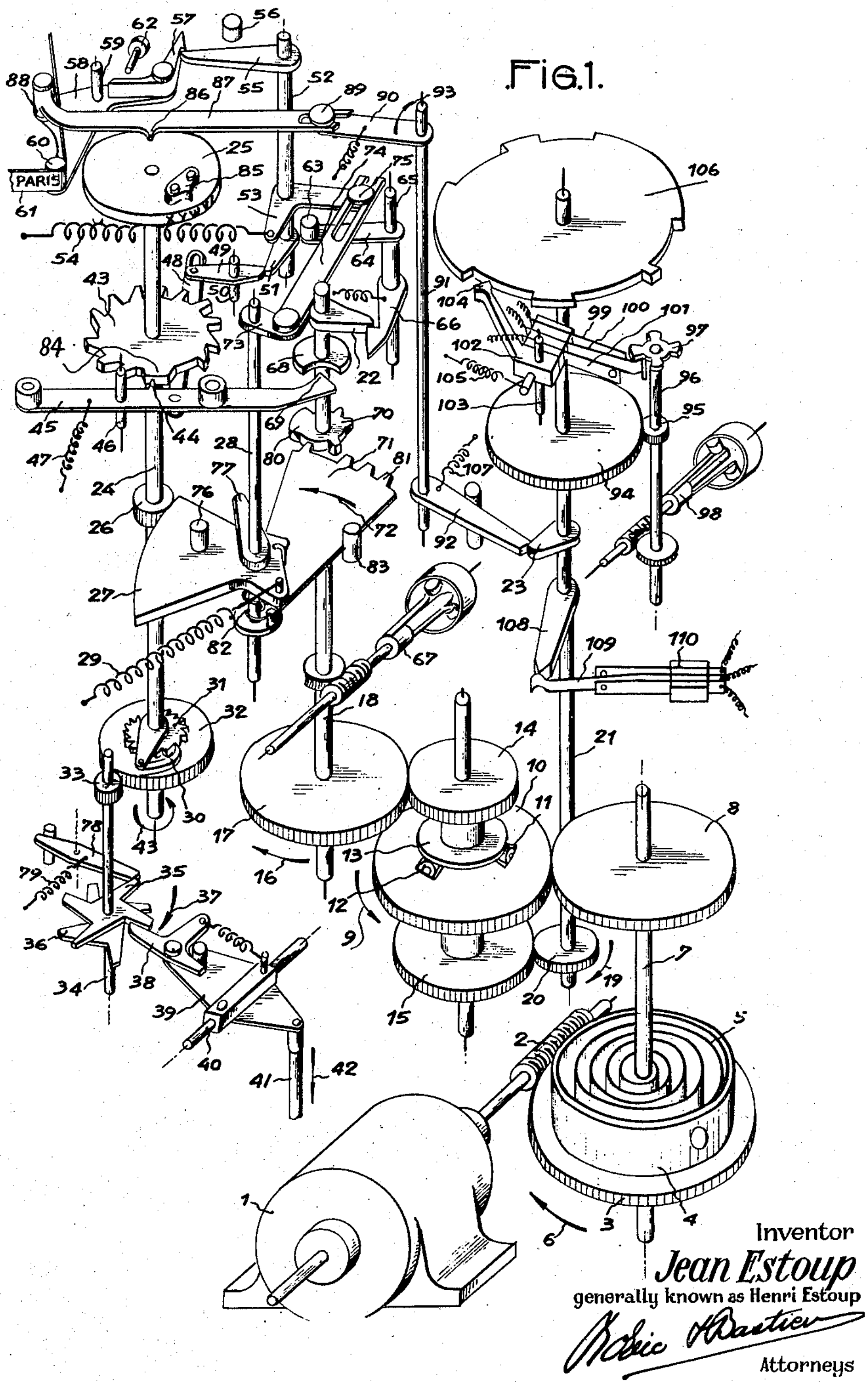
Fig. 1 is a general diagrammatic perspective view illustrating the translating and receiving mechanism and the mechanism transmitting the answer-back signals.

In order that the description may be more readily understood the mechanism will be described as if it included only a translating and receiving station and a transmitter for the answer-back signal although the systems considered include generally a key or dial operated transmitter. An arrangement incorporating such a transmitter and a receiver translator and transmitter for the answer-back signal will be described afterwards.

*Drive of the mechanisms.*—The electric motor 1 drives through the worm 2 a worm wheel 3 rigid with a drum 4 containing the spring 5 controlling in its turn for rotation in the direction of the arrow 6 the spindle 7 carrying the gearwheel 8. The gearwheel 8 drives in the direction of the arrow 9 the planet carrier wheel 10 of the differential gearing constituted by bevel planet pinions 11 and 12, the bevel pinion 13 that is rigid with the output sunwheel 14 on one hand, and a bevel pinion not illustrated rigid with the output sunwheel 15 on the other hand.

The sunwheel 14 drives in the direction of the arrow 16 a gearwheel 17 secured to the winding up spindle for the translating mechanism 18. The wheel 15 drives similarly along with it in the direction of the arrow 19 the wheel 20 secured to the spindle 21 transmitting the answer-back signal. The two spindles 18 and 21 are therefore submitted to the constant pressure of the spring 5 through the agency of the sun-and-planet gear 10, 11, 12, 13, 14, 15 which totalizes their movements.

A projection 22 on the spindle 18 is adapted to hold it in its inoperative position when no character signal is being received. Similarly, a projection 23 on the spindle 21 is adapted to hold it in its inoperative position when the transmitter of answer-back signals is inoperative.

A mechanism, not illustrated indicating the state of winding, starts the electric motor 1 running when the spring 5 is slack and stops it when it is tensioned again.

*Receiving and translating mechanism.*—The receiving and translating mechanism includes a spindle 24 carrying a character wheel 25 provided if required with means for transforming into letters and into digits as known per se and therefore not illustrated.

The spindle 24 meshes through the pinion 26 with the toothed sector 27 adapted to rock freely round the spindle 28 and submitted to the permanent pressure of a strong spring 29.

The spindle 24 drives through the catch 30 a ratchet wheel 31 that has as many teeth as there are steps to be provided per revolution of the character wheel 25.

The ratchet wheel 31 is rigid with the gearwheel 32 adapted to drive the pinion 33 secured to the spindle 34 carrying in its turn an escapement ratchet, including two stars the teeth of which are shifted angularly as shown at 35 and 36, said stars being therefore submitted by the spring 29 to a constant stress in the direction of the arrow 37. The star 35 abuts in the absence of any operative impulse against a catch 38 carried by a member 39 adapted to rock round a transversal spindle 40. Said part 39 is connected through a link 41 to the armature of an electro-magnet drawing it in the direction of the arrow 42 when the electro-magnet is fed with an inoperative current and in the opposite direction when said electro-magnet is fed with operative current.

Supposing the electro-magnet receives a train of operative impulses separated by short periods of rest, the catch 38 that is drawn alternatingly into engagement with the star 35 and with the underlying star 36 allows the star-spindle 34 to move step by step under the checking action of the spring 29 exerted through 27—26 and 32—33. The spindle 24 advances step by step in the direction of the arrow 43 until the train of impulses stops.

During the progression of the spindle 24, the notched wheel 43 has recessed and projecting parts registering in alternation with a tooth 44 on a rocking beam 45 adapted to pivot round the axis on the spindle 46 and submitted to the constant action of the spring 47. As long as the succession of the intermittent movements is a rapid one, the rocking beam 45 remains spaced with reference to the notched wheel 43. When the operative impulses stop and the tooth 44 lies in front of a recess, the beam 45 submitted to the action of the spring 47 pivots round the axis 46 to engage the recess in the wheel 43. Through the agency of the pusher member 48, the beam then urges the stop lever 49 to pivot round the stub axle 50. The stop lever 49 releases thus the projection 51 on the spindle 52 carrying a lever 53 submitted permanently to the action of the spring 54.

The lever 55 also carried by the spindle 52 is urged towards the stop 56 and carries along with it the catch 57 rigid with the lever 58 pivotally carried by the spindle 59. The lever 58 carries a printing roller 60 over which extends the paper strip 61 which is thus always urged against the selected character of the character wheel. At the end of the movement of the lever 55, the catch 57 is released through the stop screw 62 and the lever 58 returns into its starting position.

*Winding up of the receiving and translating mechanism.*—At the end of its stroke the lever 53 on the spindle 52 impinges against a stud 63 carried by the lever 64 rigid with the spindle 65. The catch 66 carried by the spindle 65 is then urged away from the projection 22 and releases it, and consequently the spindle 18 starts moving in the direction of the arrow 16. In order to avoid too sudden a winding up, the movement of the spindle 18 is braked by a moderating system such as a centrifugal regulator 67 for instance.

At the beginning of the movement, a cam 68 rigid with the spindle 18 and lying, when inoperative with its notch facing an extension 69 of the rocking beam 45, turns so as to urge said beam 45 forwards in a manner such that the tooth 44 disengages the teeth of the notched wheel 43 and cannot prevent the return movement of the spindle 24.

A cam 70 keyed to the same spindle 18 and carrying gear teeth may engage a toothed sector 71 secured to the spindle 28 and carrying correspondingly positioned gear teeth; said cam shifts the sector in the direction of the arrow 72; the spindle 28 carries a lever 73 to which is pivotally secured a pusher member 74 adapted to shift a stud 75 carried by the lever 53. During its movement, the spindle 28 returns the spindle 52 into its inoperative position and brings the projection 51 thereon into engagement with the stop lever 49, while tensioning the spring 54 so that it may be ready for the following printing step.

During forward movement, the sector 27, freely mounted on spindle 28 has moved through the action of the spring 29 by an amount depending on the number of impulses characterizing the letter or character transmitted whereby the stud 76 on said sector is caused to move nearer the projection 77 rigidly carried by the spindle 28; when the spindle 28 moves under the action of the spindle 18 and sector 71, the projection 77 comes into contact with the stud 76 and urges it back whereby the spindle 24 is carried along in the direction opposed to that of the arrow 46 and returns into its inoperative starting position. During this movement, the catch 30 slides over the teeth of the ratchet wheel 21 without driving the spindle 34. In order to prevent the latter from moving, a catch 78 submitted to the action of a light spring 79 locks one tooth of the star 35 and checks rearward movement of the star system.

Towards the end of its movement, the cam 70 is adapted to engage the sector 71 through a wide projection 80 that slides over the last tooth 81 of the sector 71 so as to hold the latter against movement during a substantial time and to allow engagement of the catch 30 and stop lever 49.

The catch 66 released through the return of the lever 63 into its inoperative position enters the path of the projection 22 whereby the spindle 18 stops in its inoperative position.

For this position, the cam 70 has a recessed portion facing the toothed sector 71. The latter has first been urged back by the springs 54 and 29 and then by a weak spring 82 returns into its inoperative position where it is stopped by stop 83. The cam 68 has again its recess facing the end 69 of the releasing rocking beam 45 but the latter is held in its inoperative position through the engagement of the tooth 44 against a broad tooth 84 of the wheel 43. At the beginning of the return of the sector 71 towards its inoperative position, the catch 30 engages the ratchet wheel 31 and the projection 51 on the spindle 52 engages the lever 49 so as to hold the spindles 23 and 52 in their inoperative position.

*Release of the answer-back signal transmitter.*—The character wheel 25 carries a tooth 85 located in a manner such that when the combination of impulses providing for the transmission of the answer-back signal has been received, said tooth 85 registers with a tooth 86 carried by a lever 87 adapted to freely rock round a pivot 88 secured to the printing lever 58. The lever 87 ends with a fork adapted to slide over the stud 89 carried by a lever 90 secured to a spindle 91 carrying a lever 92 serving as a stop for the projection 23 that serves for holding the spindle 21 in its inoperative position.

If it is supposed that the combination corresponding to an answer-back signal has been received, the teeth 85 and 86 are in register. At the moment at which the lever 58 urges the strip carrying roller 60 towards the character wheel, the lever 87 is urged towards the tooth 85; it rocks round the tooth 86 and it carries along with it the stud 89 in the direction of the arrow 93 so as to bring the lever 92 out of engagement with the projection 23, which releases the spindle 21 that transmits the answer-back signal.

If the combination received is not that which is to provide for the transmission of the answer-back signal, the tooth 86 is inoperative as it does not engage 85 and the lever 87 rocks round the stud 89; spindle 91, the lever 92 and the spindle 21 remain locked in their inoperative position.

*Transmission of an answer-back signal.*—Supposing the answer-back signal has been called for, the spindle transmitting the call signal 21 is released and moves under the action of the spring 5. The spindle 21 drives through a suitable gear-work illustrated diagrammatically by the wheel 94 and the pinion 95, a spindle 96 providing for the transmission of impulses and carrying the transmitting star-shaped member of insulating material 97, the movement of which is made uniform by the centrifugal regulator 98.

In front of the transmitting star-shaped member 97 is located a system of contact blades 99, 100 and 101, the central bent blade 100 of which system is adapted to be brought by the star-shaped member 97 into alternating engagement with the inoperative blade 99 and with the operative blade 101.

The system of transmitting contact-blades is carried by a member 102 adapted to rock round a stub shaft 103 and carrying a shoe 104 that is urged constantly by a spring 105 towards the cam 106 used for producing the answer-back signal and carried by the spindle 21 serving for the answer-back signal transmission.

The central blade 100 engages the impulse-transmitting star 97 when the shoe 104 engages a projecting portion of the cam 106 and it disengages same when it enters a recess in said cam by reason of its rocking round the stub shaft 103.

The combination of characters forming the answer-back signal of the apparatus is provided by the design given to the transmitting cam, the projecting portion being of a more or less considerable length according to the length of the train of impulses to be transmitted for any character and the recesses being of a uniform length so as to allow for translation and for return of the mechanism to its inoperative position. Obviously the reverse combination may be adopted in which case the projecting parts urge the central blade 100 away from the impulse transmitting cam 97 while the recesses provide for engagement under the action of a sufficiently strong spring. In this case, the projecting parts have a uniform length whilst the recesses are given a variable length.

At the end of its revolution, the spindle 21 remains stationary in its inoperative position through engagement of the projection 23 with the lever 92 that has been urged back into engagement through its return spring 107.

For the inoperative position of the spindle 21 transmitting the answer-back signal, a projection 108 of said spindle engages a contact blade 109 adapted to provide for the switching of the transmitting and receiving circuit in accordance with known diagrams by means of contact pieces illustrated diagrammatically under the form of superposed parts 110.

Figure 2:
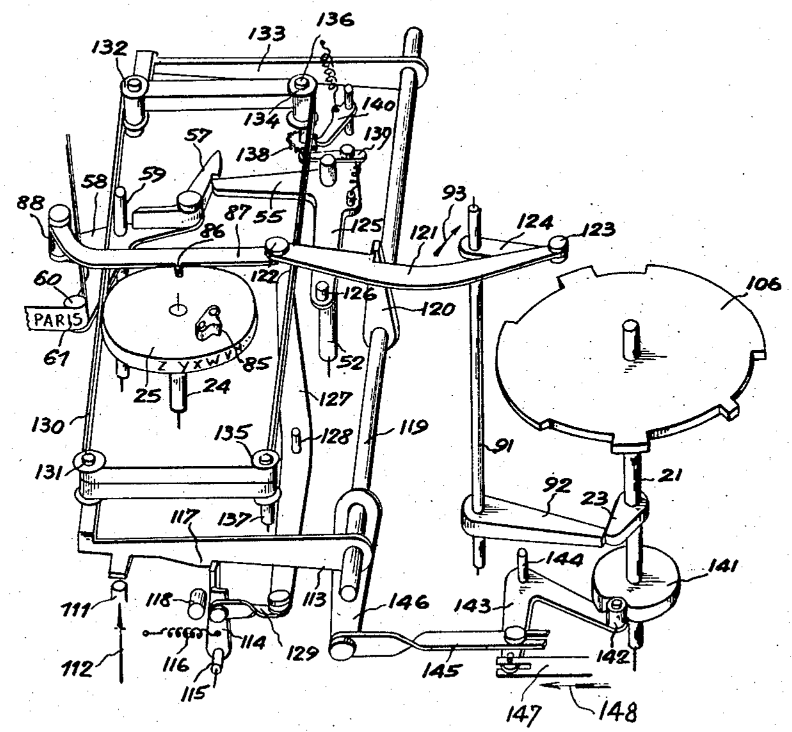
Fig. 2 is a perspective view of the control means releasing the answer-back signal transmitter when the apparatus is associated with a sender.

*Release of the answer-back signal transmitter on an apparatus including a sender.*—Fig. 2 illustrates the release mechanism in the case where the apparatus includes in addition to the receiver and translator device and the answer-back signal transmitter, a sender transmitter. In this case, it is necessary that when an operator calls for the answer-back signal of the receiving station, the checking translation performed on his own apparatus should not release his own answer-back signal transmitter. It is of interest to make use of the selecting mechanism that is consequently necessary in order to distinguish the signal transmitted by the operator's apparatus from those received, through the color of the impression that may be black for instance for the signals received and red for the signals transmitted, and also for preventing operation of the sender if required during the transmission of the answer-back signal.

The sender transmitter may be of any type such as of a key board or a dial-operated type. In any case it will be readily imagined that when the operator acts on a key of a keyboard or on a dial, the movement of the part actuated may urge a pusher-member 111 in the direction of the arrow 112. The pusher member 111 thus actuated raises a lever 113 resting on a catch 114 adapted to rock round a spindle 115 and submitted to the constant action of a weak spring 116. When the raising of the lever 113 has progressed sufficiently, the catch 114 drops underneath a tooth 117 carried by the lever 113 until it is arrested by the stop 118. When the pusher-member 111 recedes, the lever 113 remains held in its upper position through the engagement of the tooth 117 bearing on the catch 114.

The lever 113 is secured to a spindle 119 carrying a stop 120 adapted to move into the path of a notched lever 121 carried on one hand by a pivot 122 secured to the lever 87 and on the other hand by a pivot 123 pivotally carrying a lever 124 carried by spindle 91.

Supposing the apparatus receives the combination calling for the answer-back signal, without the sender being actuated, the lever 113 lies in its lower position and the stop 120 engages the solid portion of the lever 121. The tooth 85 on the character wheel 25 then faces the tooth 86 as disclosed herein above; when the printing is being performed, the lever 87 is urged towards the axis of the character wheel. The tooth 86 meets the tooth 85, the lever 87 rocks round the point of engagement between the two teeth whereby the lever 121 connected therewith moves towards the projection 120. The lever 121 rocks in its turn together with the lever 124 and constrains the spindle 91 to rock in the direction of the arrow 93. The lever 92 releases the projection 23 and the answer-back signal transmitting spindle starts moving as precedingly.

If it is supposed that the apparatus receives the combination corresponding to the calling for an answer-back signal for checking translation of this calling combination transmitted through the sender associated to the apparatus considered, the lever 113 is raised, the projection 120 lies in front of a recess in the lever 121 and the thrust exerted by the lever 87 on the lever 121 produces no result and leaves the spindle 91 and consequently the spindle 21 adapted to transmit the answer-back signal in their inoperative position.

The lever 55 of the printing mechanism carries an extension 125 on which is secured a stud 126 that, at the end of the printing movement engages a lever 127 adapted to pivot round a spindle 128. The lever 127 urges backwards through the agency of a link 129 the catch 114. The lever 127 drops back into its inoperative position in the recessed part of the lever 113, the catch 114 engaging then under the action of the spring 116 the edge of the tooth 117.

*Printing in two colors.*—The printing of the character that has been received is obtained by means of a two-color inking ribbon 130 of the type generally used in typewriters, said ribbon being fed between the character wheel 25 and the ribbon carrying roller 60. The ribbon 130 is carried by two spools with conical flanges 131 and 132 carried respectively by the lever 113 and by a lever 133 also secured to the spindle 119.

The system thus constituted holds, for printing on the wheel 25, the upper half of the ribbon when the lever 113 is in its lower position, which indicates that the incoming signal has been received while the lower half of the ribbon serves for the printing when the lever 113 is in its upper position, indicating that the character translated has been transmitted by the sender of the apparatus itself. The ribbon may assume to advantage the shape of an endless member passing round the two spools 131—132 and two further spools 134 and 135 carried respectively by stationary spindles 136 and 137. The spool 134 is rigid with a ratchet wheel 138 shifted at each printing of a character by a catch 139 carried by the lever 55 while a pawl 140 opposes the rearward movement of the ratchet wheel 138. The ribbon 130 assumes thus a continuous movement round the system of four spools 131, 132, 134, 135.

The transmitting spindle 21 carries a cam 141 against which bears a cam follower 142 carried by the bellcrank 143. When the transmitting spindle 21 begins revolving, it urges away the cam follower 142 which makes the bellcrank 143 rock round the spindle 144. This urges a pusher-member 145 into movement so as to drive a lever 146 secured to the spindle 119 which thus rocks into their upper position the lever 113 and 133 whereby the color corresponding to signal transmission is provided for the printing.

A link 147 may be moved in the direction of the arrow 148 and serve for locking the sender through arrangements that depend on the actual structure of said sender.

When inoperative, the cam follower 142 drops into the notch of the cam 141 and the levers 113 and 133 may return into their inoperative lower position corresponding to character reception.

Figure 3:
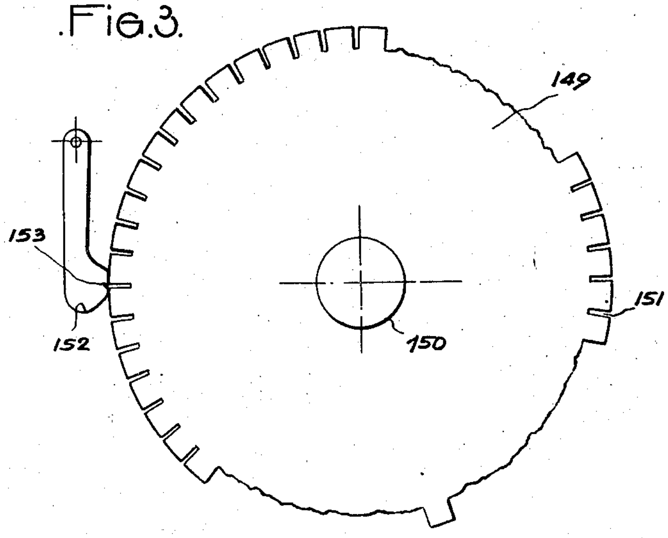
Fig. 3 is a plan view of the preferred embodiment of the cam transmitting the answer-back signal and of the shoe controlling the position of the transmitting contact blades.

*Execution of the answer-back signal transmitting cam.*—It is necessary for the cam transmitting the call signal to allow an easy and speedy setting and removal, to be of a low cost price and to require only a reduced amount of work that may be executed with standard tools. In order to satisfy such requirements, the transmitting cam 149 as illustrated in Fig. 3 in its most advantageous structure includes a thin sheet of steel, Duralumin or the like, provided with an axial perforation 150 bored with great accuracy and perfectly centered with reference to the outer circumference of the cam. The cam is provided with equidistant radial slots of constant width 151, the number of which is equal to the total number of impulses provided per revolution of the spindle 21 transmitting an answer-back signal.

Such discs may be obtained easily at a low cost, and they may be secured through a mere nut over the projecting threaded end of the spindle 21.

To provide for a given answer-back signal, the teeth thus constituted at the periphery of the disc are broken off through pliers for instance, to correspond to the inoperative intervals to be obtained between the impulse trains without modifying at all the teeth corresponding to the actual impulses.

In order to prevent the passage of the shoe 104 or 152 (Fig. 3) over the radial slots from producing irregularity in the transmission of the answer-back signal, the shoe is given a bearing surface 153 matching the outer periphery of the cam 149 over a length that is greater than the breadth of a slot.

By way of exemplification, it may be mentioned that a transmitting cam operating with 160 impulses for instance may provide, with inoperative intervals corresponding to 8 impulses between the characters 7 or 8 letters or else two digits followed by 5 or 6 letters, which is ample for practical requirements.

The present invention is by no means limited to the embodiment that has been more particularly described and it covers all modifications thereof falling within the scope of accompanying claims.

What I claim is:

1. In an impulse telegraph system, the combination of a mechanism adapted to receive and to translate impulse trains and including a character wheel, a spindle carrying same, and means actuated by the incoming impulses controlling the step by step progression of said wheel, a printing mechanism, yielding means urging said printing mechanism towards the character wheel for cooperation therewith when the main spindle of the mechanism stops at the end of the reception of an impulse train, a mechanism adapted to transmit a predetermined answer-back signal constituted by impulse trains separated by intervals, a winding up spindle, a single spring motor, a sun and planet gear including a planet carrier controlled by the spring motor and sunwheels controlling respectively the second mechanism and the winding up spindle, means for locking the second mechanism against operation and means for releasing same operating through reception on the first mechanism of a predetermined signal, means whereby the winding up spindle controlled by the spring motor executes one revolution after each transmission for returning the first mechanism and the printing mechanism into their inoperative starting position.

2. In an impulse telegraph system, the combination of a mechanism adapted to receive and to translate impulse trains and including a character wheel, a spindle carrying same and means actuated by the incoming impulses controlling the step by step progression of said wheel, a printing mechanism, yielding means urging said printing mechanism towards the character wheel for cooperation therewith when the main spindle of the mechanism stops at the end of the reception of an impulse train, a mechanism adapted to transmit a predetermined answer-back signal constituted by impulse trains separated by intervals, a winding up spindle, a single spring motor, a sun and planet gear including a planet carrier controlled by the spring motor and sunwheels controlling respectively the second mechanism and the winding up spindle, means for locking the second mechanism against operation and means for releasing same operating through reception on the first mechanism of a predetermined signal, means whereby the winding up spindle controlled by the spring motor executes one revolution after each transmission for returning the first mechanism and the printing mechanism into their inoperative starting position, a stop engaging the winding up spindle for holding it in its inoperative position and means associated with the yielding means on the printing mechanism for moving said stop away from the winding up spindle for releasing same.

3. In an impulse telegraph system, the combination of a mechanism adapted to receive and to translate impulse trains and including a character wheel, a spindle carrying same and means actuated by the incoming impulses controlling the step by step progression of said wheel, a printing mechanism, yielding means urging said printing mechanism towards the character wheel for cooperation therewith when the spindle of the mechanism stops at the end of the reception of an impulse train, a mechanism adapted to transmit a predetermined answer-back signal constituted by impulse trains separated by intervals, a winding up spindle, a single spring motor, a sun and planet gear including a planet carrier controlled by the spring motor and sunwheels controlling respectively the second mechanism and the winding up spindle, means for locking the second mechanism against operation and means for releasing same operating through reception on the first mechanism of a predetermined signal, means whereby the winding up spindle controlled by the spring motor executes one revolution after each transmission for returning the first mechanism and the printing mechanism into their inoperative starting position, a cam carried by the winding up spindle, a rocking beam engaging said cam and a notched wheel coaxial with and rigid with the character wheel and adapted to engage said rocking beam when released by the cam in the angular position thereof corresponding to inoperativeness of the winding up spindle.

4. In an impulse telegraph system, the combination of a mechanism adapted to receive and to translate impulse trains and including a character wheel, a spindle carrying same and means actuated by the incoming impulses controlling the step by step progression of said wheel, a printing mechanism, yielding means urging said printing mechanism towards the character wheel for cooperation therewith when the main spindle of the mechanism stops at the end of the reception of an impulse train, a mechanism adapted to transmit a predetermined answer-back signal constituted by impulse trains separated by intervals, a winding up spindle, a single spring motor, a sun and planet gear including a planet carrier controlled by the spring motor and sunwheels controlling respectively the second mechanism and the winding up spindle, means for locking the second mechanism against operation and means for releasing same operating through reception on the first mechanism of a predetermined signal, means whereby the winding up spindle controlled by the spring motor executes one revolution after each transmission for returning the first mechanism and the printing mechanism into their inoperative starting position and a centrifugal regulator associated with the winding up spindle.

5. In an impulse telegraph system, the combination of a mechanism adapted to receive and to translate impulse trains and including a character wheel, said character wheel including a tooth the location of which is defined according to the incoming impulse train that is to release the mechanism transmitting the answer-back signal, a lever pivotally secured to the printing mechanism and including a tooth adapted when engaging the tooth on the character wheel upon operation of the printing mechanism to release the mechanism transmitting the answer-back signal, and means actuated by the incoming impulses controlling the step by step progression of said wheel, a printing mechanism, yielding means urging said printing mechanism towards the character wheel for cooperation therewith when the receiver mechanism stops at the end of the reception of an impulse train, a mechanism adapted to transmit a predetermined answer-back signal constituted by impulse trains separated by intervals, a winding up spindle, a single spring motor, a sun and planet gear including a planet carrier controlled by the spring motor and sunwheels controlling respectively the second mechanism and the winding up spindle, means for locking the second mechanism against operation and means for releasing same operating through reception on the first mechanism of a predetermined signal, and means whereby the winding up spindle controlled by the spring motor executes one revolution after each transmission for returning the first mechanism and the printing mechanism into their inoperative starting position.

6. In an impulse telegraph system, the combination of a mechanism adapted to receive and to translate impulse trains, a mechanism adapted to transmit a predetermined answer-back signal constituted by impulse trains separated by intervals, a winding up spindle, a single spring motor, a sun and planet gear including a planet carrier controlled by the spring motor and sunwheels controlling respectively the second mechanism and the winding up spindle, means for locking the second mechanism against operation and means for releasing same operating through reception on the first mechanism of a predetermined signal, a sender, a lever actuated by said sender, a transversal indicating spindle controlled by said lever, a projection on said transversal spindle, a transmission lever adapted to engage said projection for one position of the transversal spindle and means whereby last mentioned lever releases the mechanism transmitting the answer-back signal when the transversal spindle has been shifted by the sender into the position considered, two levers rigid with the transversal spindle, spools carried by said levers, a two-color inking ribbon carried by said spools, the relative location of said spools with reference to the character wheel depending on the position assumed by said transversal spindle.

7. In an impulse telegraph system, the combination of a mechanism adapted to receive and to translate impulse trains, a mechanism adapted to transmit a predetermined answer-back signal constituted by impulse trains separated by intervals, a winding up spindle, a single spring motor, a sun and planet gear including a planet carrier controlled by the spring motor and sunwheels controlling respectively the second mechanism and the winding up spindle, means for locking the second mechanism against operation and means for releasing same operating through reception on the first mechanism of a predetermined signal, a sender, a lever actuated by said sender, a transversal indicating spindle controlled by said lever, a projection on said transversal spindle, a transmission lever adapted to engage said projection for one position of the transversal spindle and means whereby last mentioned lever releases the mechanism transmitting the answer-back signal when the transversal spindle has been shifted by the sender into the position considered, two levers rigid with the transversal spindle, spools carried by said levers, a two-color inking ribbon carried by said spools, the relative location of said spools with reference to the character wheel depending on the position assumed by said transversal spindle, a cam operatively connected with the answer-back signal mechanism, a cam follower associated therewith and a leverage associating said cam follower with the transversal spindle for urging the transversal spindle into its operative position when the signal mechanism is operative and for releasing same when last mentioned mechanism is inoperative.

8. In an impulse telegraph system, the combination of a mechanism adapted to receive and to translate impulse trains and including a character wheel and means actuated by the incoming impulses controlling the step by step progression of said wheel, a printing mechanism, yielding means urging said printing mechanism towards the character wheel for cooperation therewith when the receiver mechanism stops at the end of the reception of an impulse train, a mechanism adapted to transmit a predetermined answer-back signal constituted by impulse trains separated by intervals, a winding up spindle, a single spring motor, a sun and planet gear including a planet carrier controlled by the spring motor and sunwheels controlling respectively the second mechanism and the winding up spindle, means for locking the second mechanism against operation and means for releasing same operating through reception on the first mechanism of a predetermined signal, means whereby the winding up spindle controlled by the spring motor executes one revolution after each transmission for returning the first mechanism and the printing mechanism into their inoperative starting position, a sender, a lever actuated by said sender, a transversal indicating spindle controlled by said lever, a projection on said transversal spindle, a transmission lever pivotally secured to the printing mechanism adapted to engage said projection for one position of the transversal spindle and means whereby last mentioned lever releases the mechanism transmitting the answer-back signal when the transversal indicating spindle has been shifted by the sender into its last mentioned position.

9. In an impulse telegraph system, the combination of a mechanism adapted to receive and to translate impulse trains, a mechanism adapted to transmit a predetermined answer-back signal constituted by impulse trains separated by intervals, a winding up spindle, a single spring motor, a sun and planet gear including a planet carrier controlled by the spring motor and sunwheels controlling respectively the second mechanism and the winding up spindle, a printing mechanism controlled by the first mechanism, means controlled by the winding up spindle for returning the different mechanisms to zero, means locking the answer-back signal transmitting mechanism, means controlled by the printing mechanism for releasing last mentioned means at the reception and translation of a predetermined signal, means whereby the operation of the printing mechanism releases the winding up spindle and means whereby either of the first mechanism and the winding up spindle when operative locks the other of said mechanism and spindle against operation.

JEAN ESTOUP,
*Generally Known as Henri Estoup.*

REFERENCES CITED

The following references are of record in the file of this patent:

UNITED STATES PATENTS

| Number | Name | Date |
|---|---|---|
| 1,689,294 | Potts | Oct. 30, 1928 |
| 1,785,940 | Ennes | Dec. 23, 1930 |
| 1,965,121 | Kardorff | July 3, 1934 |
| 2,147,249 | Franklin | Feb. 14, 1939 |